Feb. 23, 1960 J. J. CARTY 2,925,975
FLORAL SUPPORTING STANDS
Filed May 23, 1956

INVENTOR
JOHN J. CARTY
BY
ATTORNEY

United States Patent Office 2,925,975
Patented Feb. 23, 1960

2,925,975

FLORAL SUPPORTING STANDS

John J. Carty, Jersey City, N.J.

Application May 23, 1956, Serial No. 586,870

3 Claims. (Cl. 248—27.8)

This invention relates to tripod and other types and kinds of stands used for the support of various types and kinds of floral arrangements mounted on a plastic, cellulose or other supporting backing in positioning of such floral arrangements for showing or display. More particularly, the invention deals with various types of floral arrangements which are positioned around or in close proximity to a casket in a funeral parlor, church or home, preparatory to the rendition of a funeral service.

Still more particularly, the invention deals with an upper stand, head or unit, to which the backing of a floral display can be directly coupled and engaged to maintain the floral display in any desired position with respect to the vertical plane of the stand.

Still further, the invention deals with a head unit, comprising a center post having a plurality of spaced elongated prongs and a pair of supporting rods arranged in different angular positions and in widespread relationship with respect to the post to provide what might be termed a three-point support or suspension of a floral display on the head structure or unit of the stand.

The novel features of the invention will be best understood from the following description, when taken together with the accompanying drawing, in which certain embodiments of the invention are disclosed and, in which, the separate parts are designated by suitable reference characters in each of the views and, in which.

Figure 1:
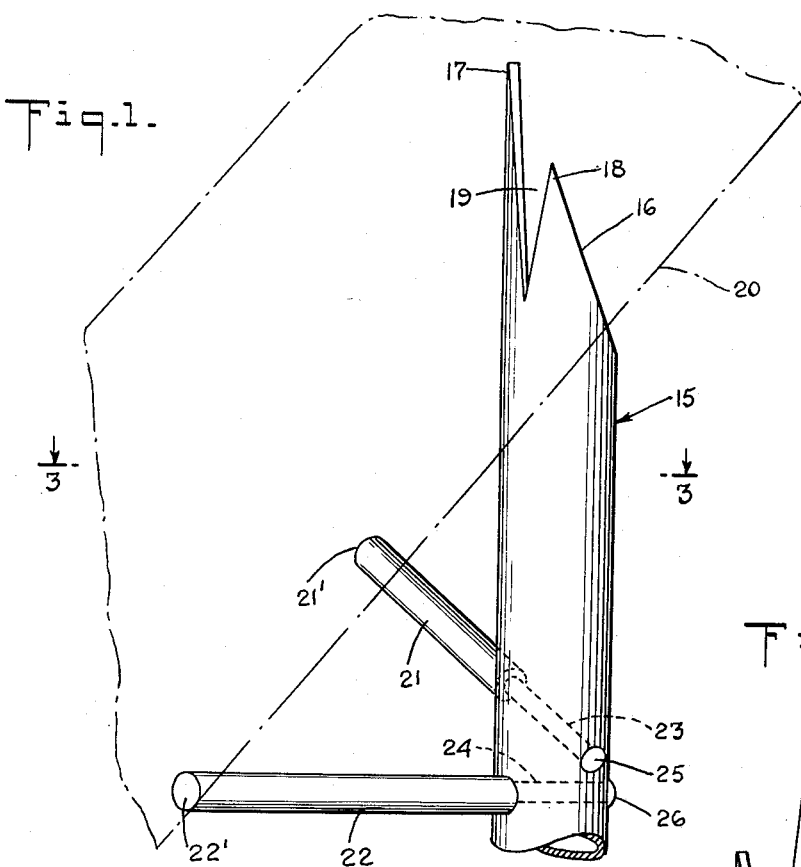
Fig. 1 is a side view of the upper portion of the head unit of a tripod or other stand, diagrammatically illustrating the arrangement of a floral backing thereon, with parts of the construction broken away and illustrating, in part, the upper portion of the lower supporting tube of a stand.
Figure 2:
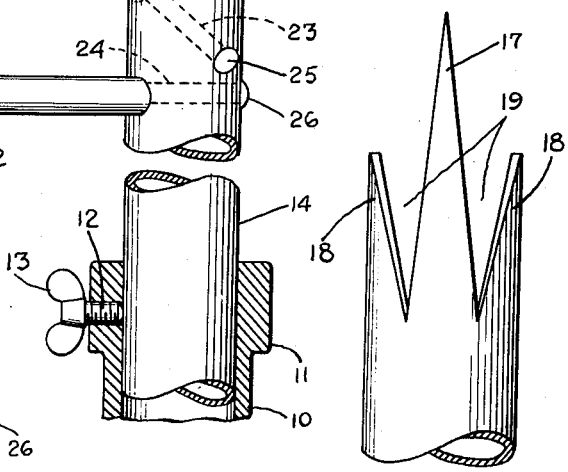
Fig. 2 is a front detail view of the upper portion of the head unit.

In order to simplify the illustration of my improved head unit, I have illustrated, in Fig. 1 of the drawing, in part, the upper portion 10 of the elongated tubular base of a conventional tripod stand, as commonly used in floral display stands of the kind under consideration, the tubular base including, at its upper end, an enlarged collar 11, in the threaded bore 12 of which is mounted a manually operated set screw 13 for adjustably securing the elongated tube or supporting member 14 of the head unit 15 in the base tube 10, so as to regulate the position of the top of the unit 15 with respect to the floor or other supporting surface, on which the stand is arranged.

The top of the unit 15, which in the construction shown comprises an elongated tube, is bevelled, as seen at 16, and the bevelled portion is cut or shaped to form a tall central front prong 17 and two side prongs 18, the wall structures of which are preferably curved or, in other words, conform to the contour of the tube and these spaced prongs form therebetween V-shaped recesses 19 so that, when a floral backing, indicated in dot-dash lines at 20, is forced downwardly over the head unit 15, the backing is pierced by the web-like end of the unit and the three prongs also pierce the backing so that parts of the backing are disposed within the tubular portioin of the unit 15 and also within the V-shaped spaces 19, so as to form a firm and rigid support of the backing 20 upon the head unit 15. In other words, the material which extends into the openings or recesses 19 serves to key the backing 20 against any rotary movement of the unit 15. The several prongs further sustain the backing against any tilting movement so that, when one angular position of the backing is determined for proper display of the floral arrangement, this angle will, at all times, be maintained.

The backing 20, upon which the floral arrangement is constructed by the florist, can be of any of the known types. However, the relatively stiff cellulose material in any desired shape or form has been commonly used and the head unit will readily pierce backings of this type and kind. At this time, it will also be pointed out that the backing 20 can assume any desired position upon the unit 15, even to the extent of supporting an end or peripheral wall structure of the backing on said unit.

Figure 3:
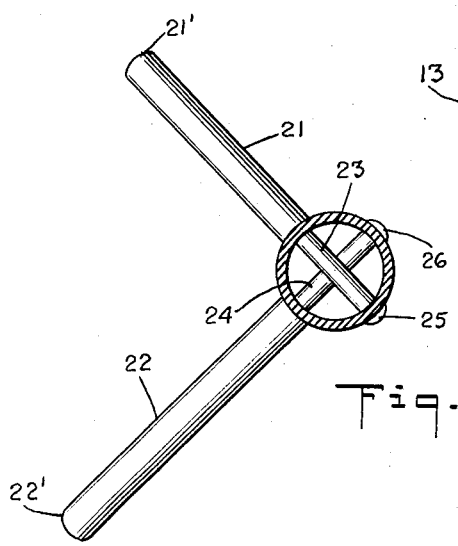
Fig. 3 is a section substantially on the line 3—3 of Fig. 1, omitting all of the background showing of the stand base.

For further support of the backing 20, I provide in the unit 15 in spaced relation to the prongs 17, 18, a pair of supplemental supporting elements 21 and 22, respectively, these elements being both in the form of rods having reduced end portions 23 and 24, respectively, which are mounted in the tube 14, the reduced ends being riveted-over, as seen at 25, 26, respectively, to retain the elements in fixed position on the unit 15. The uppermost element 21 extends upwardly and laterally, as will appear from a consideration of Figs. 1 and 3 of the drawing; whereas, the element 22 is substantially horizontally disposed or, in other words, at right angles to the tube 14 but again extending laterally, as seen in Fig. 3 of the drawing, so as to provide a relatively wide spread with respect to the ends 21′, 22′, of said elements and these widespread ends, in conjunction with the prongs 17, 18 provide what might be termed a three-point suspension and support of the backing 20, particularly when said backing is disposed in an upwardly inclined relationship with respect to the unit 15, substantially as diagrammatically illustrated in Fig. 1 of the drawing.

The elements 21 simply provide additional braces and stabilizers which will take up any shock or strain to which the floral display may be subjected in positioning or handling of the display when arranged upon the stand.

It will be understood that the end portions 21′, 22′ can, in some instances, be forced into the backing 20 to establish a positive engagement; whereas, in other instances, the backing may simply rest upon this supplemental support which is provided on the unit. This simple and economical construction dispenses with the use of widespread table or framelike supports, which are usually employed on display stands of the type and kind under consideration, thus materially reducing the cost of the ultimate stand and, further, I have found from experience and use, that my simple construction provides, in many instances, more firm support and a support having a wider range of mounting of floral displays in conjunction with the stand.

While I have specifically described the invention as applicable to the stands for the support of floral displays or arrangements of various kinds and classes, it will be understood that a head unit of the type and kind under consideration can be used in conjunction with any type and kind of body, such as the body 20 in the support of arrangements of different types and kinds. The primary feature of my head unit is to provide means for positively engaging a pierceable body in support of said body in any desired position with respect to a predetermined plane of the unit.

Having fully described my invention, what I claim as new and desire to secure by Letters Patent is:

1. In devices of the character described employing a tubular base, a tubular supporting member mounted in and extending above said base, said supporting member including a tubular head unit the axis of which is in axial alignment with said base, the free end of said head unit having a tapered portion and a plurality of long and short circumferentially spaced prongs in alignment with the wall of said unit, said prongs being adapted to pierce a pierceable backing, upon which predetermined articles are arranged, and said head unit including radially extending supplemental supporting means arranged below said tapered portion and prongs and adapted to engage the backing in maintaining the backing in predetermined position with respect to said head unit.

2. A device of the character described comprising a base, a tubular head unit supported on and extending above said base in axial alignment therewith, said head unit having, at its free end, a tapered portion, walls of the tapered portion being fashioned to form a plurality of circumferentially spaced prongs in alignment with the wall of said unit and spaced by deep recesses, at least one prong being longer than the others, said head unit being adapted to pierce a pierceable backing engaging the prongs and extending into the recesses of the head unit in keying the backing against shifting movement while supported on said head unit, said head unit having supplemental supporting elements inwardly of the pronged end thereof adapted to engage a backing supported on the head unit in further stabilizing and supporting the backing on said unit, said elements comprising radially, upwardly and laterally extending rods, and terminal ends of said rods being widespread with respect to each other and to the body portion of the head unit.

3. In devices of the character described employing a tubular base, a tubular supporting member mounted in and extending above said base, said supporting member including a tubular head unit in axial alignment with said base, said head unit having a plurality of long and short circumferentially spaced prongs in alignment with the wall of said unit, said prongs being adapted to pierce a pierceable backing, upon which predetermined articles are arranged, said supporting member including radially extending supplemental supporting means arranged below said prongs and adapted to engage the backing in maintaining the backing in predetermined position with respect to said head unit, and said means comprising a pair of rods extending radially with respect to said head unit, the rods being arranged angularly to each other, one rod being disposed horizontally and the other rod being inclined with respect to the first named rod.

References Cited in the file of this patent

UNITED STATES PATENTS

| | | |
|---|---|---|
| 1,568,607 | Junkunc | Jan. 5, 1926 |
| 1,720,338 | Loper et al. | July 9, 1929 |
| 1,769,198 | Albany | July 1, 1930 |
| 1,958,716 | Roach et al. | May 15, 1934 |
| 2,238,524 | Hurlbut | Apr. 15, 1941 |
| 2,324,717 | Novak | July 20, 1943 |
| 2,522,223 | Hardin et al. | Sept. 12, 1950 |
| 2,701,700 | Williamson | Feb. 8, 1955 |

FOREIGN PATENTS

| | | |
|---|---|---|
| 132,083 | Great Britain | Sept. 11, 1919 |